US012627180B2

(12) United States Patent
Aloui et al.

(10) Patent No.: US 12,627,180 B2
(45) Date of Patent: May 12, 2026

(54) METHOD FOR DETECTING AN OBJECT TO BE CHARGED AND ASSOCIATED CHARGING DEVICE

(71) Applicant: Continental Automotive GmbH, Hannover (DE)

(72) Inventors: Brahim Aloui, Toulouse (FR); Jean-Philippe Sanchis, Toulouse (FR); Isabelle Bacaer, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 1028 days.

(21) Appl. No.: 17/724,736

(22) Filed: Apr. 20, 2022

(65) Prior Publication Data

US 2022/0360120 A1      Nov. 10, 2022

(30) Foreign Application Priority Data

May 4, 2021    (FR) ...................................... 2104667

(51) Int. Cl.
| | |
|---|---|
| *H02J 50/90* | (2016.01) |
| *B60L 53/122* | (2019.01) |
| *B60L 53/62* | (2019.01) |
| *G01V 3/10* | (2006.01) |
| *H02J 50/10* | (2016.01) |
| *H02J 50/40* | (2016.01) |

(52) U.S. Cl.
CPC ............ *H02J 50/90* (2016.02); *B60L 53/122* (2019.02); *B60L 53/62* (2019.02); *G01V 3/10* (2013.01); *H02J 50/10* (2016.02); *H02J 50/402* (2020.01)

(58) Field of Classification Search
CPC ....................................... H02J 50/90

USPC .......................................................... 320/108
See application file for complete search history.

(56) References Cited

U.S. PATENT DOCUMENTS

| | | | | |
|---|---|---|---|---|
| 2010/0259217 A1* | 10/2010 | Baarman | ................. | H02J 50/80 |
| | | | | 320/108 |
| 2014/0347007 A1 | 11/2014 | Kee et al. | | |

(Continued)

FOREIGN PATENT DOCUMENTS

| | | |
|---|---|---|
| CN | 107124043 A | 9/2017 |
| CN | 107689661 A | 2/2018 |

(Continued)

OTHER PUBLICATIONS

French Preliminary Search Report and Written Opinion for French Application No. 2104667, dated Nov. 25, 2021. 8 pages.

(Continued)

*Primary Examiner* — Ahmed H Omar
(74) *Attorney, Agent, or Firm* — Buchanan Ingersoll & Rooney PC.

(57) ABSTRACT

A method for detecting an object to be charged by an induction-charging device including at least one transmitting coil. The method includes transmission, by the at least one coil, of an electrical pulse the value of which is within a window of values predetermined using test receivers, and the object to be charged generating a communication signal in response. The method including, if charging conditions are favorable, the modulation of the value of the electrical pulse outside of the window of predetermined values according to the presence and/or the value of the communication signal, in order to detect the presence of an object to be charged.

17 Claims, 3 Drawing Sheets

(56)      References Cited

U.S. PATENT DOCUMENTS

| | | | | |
|---|---|---|---|---|
| 2016/0336807 A1* | 11/2016 | Mach | .................... | H02J 50/80 |
| 2016/0336816 A1* | 11/2016 | Mach | .................... | H02J 50/10 |
| 2017/0110913 A1* | 4/2017 | Shin | ..................... | H02J 50/12 |
| 2017/0250574 A1 | 8/2017 | Min et al. | | |
| 2018/0102668 A1 | 4/2018 | Hong et al. | | |
| 2018/0131243 A1* | 5/2018 | Hamaguchi | ............ | H02J 50/12 |
| 2018/0226815 A1* | 8/2018 | Yamanishi | ............. | H02J 50/90 |
| 2018/0248408 A1 | 8/2018 | Chen | | |
| 2018/0323658 A1 | 11/2018 | Cheikh | | |
| 2018/0366986 A1 | 12/2018 | Kim et al. | | |
| 2020/0266670 A1* | 8/2020 | Ha | .......................... | H02J 50/10 |
| 2020/0295606 A1 | 9/2020 | Park et al. | | |
| 2021/0296941 A1* | 9/2021 | Shichino | ................ | H02J 50/60 |
| 2023/0307961 A1* | 9/2023 | Schwartz | ............... | H02J 50/70 |

FOREIGN PATENT DOCUMENTS

| | | | |
|---|---|---|---|
| CN | 108401471 A | 8/2018 | |
| CN | 108475945 A | 8/2018 | |
| CN | 111600398 A | 8/2020 | |
| KR | 10-1812444 B1 | 12/2017 | |

OTHER PUBLICATIONS

Office Action (First Office Action) issued Apr. 30, 2025, by the National Intellectual Property Administration, P. R. China in corresponding Chinese Patent Application No. 202210465646.1 and an English translation of the Office Action. (19 pages).

\* cited by examiner

METHOD FOR DETECTING AN OBJECT TO BE CHARGED AND ASSOCIATED CHARGING DEVICE

CROSS REFERENCE TO RELATED APPLICATIONS

This application claims priority to French Patent Application No. 2104667, filed May 4, 2021, the contents of such application being incorporated by reference herein.

FIELD OF THE INVENTION

The field of the invention is the field of magnetic induction charging devices. In particular, the invention relates to a method for detecting an object to be charged located close to a magnetic induction electrical charging device and to an associated charging device.

BACKGROUND OF THE INVENTION

Magnetic induction electrical charging technology is implemented in a system comprising a wireless electrical charging device and an electrical storage battery to be charged in a mobile terminal such as, for example, a portable item of user equipment, such as a mobile telephone. The electrical charging device comprises a transmission coil, or transmitting coil. The electrical storage battery comprises a receiving coil to be charged. When the transmission coil and the receiving coil are located opposite each other, variations in the magnetic field that is generated by the transmission coil cause an electric current to flow in the receiving coil, thereby charging the electrical storage battery.

Induction charging technology meets the requirements of a standard, in this case it is the Qi® standard of the Wireless Power Consortium, also called the WPC standard.

In order to detect the presence of an electrical storage battery comprising a receiving coil located opposite the transmission coil of the electrical charging device, three steps are currently implemented.

In a first step, the methods of the prior art seek to detect the presence of an object located opposite the electrical charging device. For this purpose, electrical pulses, also called "analog pings" or "APs", are sent at the charging frequency via the transmission coil of the electrical charging device to the receiving coil. An analog ping is a continuous signal, exhibiting periodic oscillations, with a period of, for example, 300 ms, and with an oscillation time of 5 to 20 ms. The voltage or the impedance at the terminals of the transmission coils is observed. If a variation in the voltage at the terminals of the transmission antenna or in the impedance of the transmission coil is detected, then there is an object opposite the transmission coil.

In a second step, a "digital ping" or "DP" is sent by each transmitting coil of the charging device in order to make it possible to detect whether a compatible object to be charged is present on the charging surface of the device. The digital ping is also an electrical pulse, but it requests a response from the object to be charged. It makes it possible to identify whether the object placed on the charging surface is a compatible object to be charged, and which transmitting coil is best coupled with the receiving coil of the object to be charged.

Specifically, the detected object may be either a parasitic object or a mobile apparatus such as a mobile telephone equipped with a receiving coil for induction electrical charging. In this second step, efforts are then made to establish digital communication with the detected object in order to identify its character. More particularly, it is sought to determine whether the detected object has a receiving coil for induction electrical charging in order to charge it. This communication is performed by modulating the amplitude of the voltage across the terminals of the transmitting coils in order to send an electrical pulse (digital ping). Next, the object to be charged, in the event of favorable coupling between one of the transmitting coils and the receiving coil, returns a communication signal called a "signal strength packet" or SSP signal to the charging device. The SSP communication signal is a value that the object returns to the charging device and which represents the coupling between its receiving coil and one of the transmitting coils of the charging device. The SSP communication signal corresponds to the ratio of the voltage of the rectifier, which converts the AC (alternating current) voltage of the receiving coil induced by receiving the digital ping into a DC voltage, to the maximum voltage of the rectifier allowed by the manufacturer of the object to be charged.

If the charging device does not receive an SSP communication signal, it deems the object placed on the charging surface to be a parasitic object, i.e. one that is not compatible for charging, and induction charging is not initiated.

Specifically, this occurs when the object to be charged is located in a region of the charging surface where coupling between the transmitting coil and the receiving coil is too weak.

In order to trigger the transmission of an SSP communication signal, the digital ping DP sent by the charging device should observe levels for the voltages induced in the object to be charged that are set by the manufacturers and this should be for predetermined durations, according to the Qi® standard of the Wireless Power Consortium, which is a global standard for induction charging. More precisely, the digital ping should last between 65 ms and 93 ms. In this time, the voltage induced in the object to be charged should not exceed thresholds set by the manufacturers, and the charging device should receive a single SSP communication signal from the object to be charged.

To that end, still according to the same standard, to obtain Qi certification, there are therefore defined minimum and maximum levels for a rectified voltage within the object to be charged which should be observed when the charging device transmits the digital ping DP. These minimum and maximum rectified voltage levels are checked in the certification phase for four types of test receivers, and they are generally between 3 V and 9 V or between 3 V and 15 V depending on the type of test receiver.

Thus, for each test receiver placed on the charging surface of the charging device to be certified, there will be determined voltage values of the transmitted digital ping DP so that the rectified voltage Vr induced in the receiver is well within the limits dictated by the Qi standard, in order to pass Qi certification.

However, this test certification has the following drawbacks:

a. the test receivers are perfectly centered with respect to each transmitting coil, b. the test receivers contain no metal parts, the magnetic field losses are therefore minimal, and virtually all of the magnetic field transmitted by the transmitting coils is received by the receiving coil. This test certification is therefore performed under optimal conditions.

Consequently, when using digital voltage pings defined in that way on typical objects to be charged such as cellphones or tablets, which may be located off-center with respect to the transmitting coils or which may contain metal parts, a portion of the magnetic field is dissipated and the rectified voltage of the object to be charged is reduced thereby. The value of said rectified voltage is then too low to cause the object to be charged to transmit an SSP communication signal. This is illustrated in FIG. 1, in which an object to be charged T is located at one end of the charging surface of a charging device D. The receiving coil A1 is then not sufficiently opposite one of the three transmitting coils B1, B2, B3 of the charging device D.

Since no SSP communication signal is sent, the object to be charged is then deemed to be a parasitic object and charging does not start.

This no-detection effect occurs in particular when the object to be charged (or more precisely the receiving coil) is located in a region between transmitting coils, or in the farthest regions from the transmitting coils, more particularly in the four corners of a rectangular charging device. Now, in the case of a charging device on board a motor vehicle, the object to be charged is placed on the charging surface in an unsecured position, and as the vehicle moves, the object will slide over the charging surface and may end up in one of the corners of the charging device where charging will not start or, if it was active before, it will cease.

Conversely, because of the intrinsic construction of the object to be charged, very strong coupling may occur between the transmitting coils and the receiving coil, with every cellphone having its own characteristics. In that case, the rectified voltage induced by the digital ping which is defined in the certification phase may be above the limit dictated by the standard, and trigger a protection mode in the object to be charged which will not send an SSP communication signal and therefore charging will not start. This strong coupling effect may occur when the receiving coil is very large, and has the same geometric shape as a transmitting coil, or when the receiving coil has a very high quality factor, or when the distance between the receiving coil and the transmitting coil is small, etc.

When, in the third step, digital communication is established between the transmitting coil and the receiving coil of the detected object via the reception of the SSP communication signal, then charging begins.

It is therefore essential to remedy the drawbacks of the prior art by means of a method for detecting an object to be charged that allows charging to be initiated over the entire charging surface of the charging device with any compatible object to be charged.

SUMMARY OF THE INVENTION

An aspect of the invention proposes a method for detecting an object to be charged by an induction-charging device comprising at least one transmitting coil, the method comprising the transmission, by the at least one coil, of an electrical pulse the value of which is within a window of values predetermined using test receivers, and the object to be charged generating a communication signal in response, the method being noteworthy in that it comprises, if charging conditions are favorable, the modulation of the value of the electrical pulse outside of the window of predetermined values according to the presence and/or the value of the communication signal, in order to detect the presence of an object to be charged.

The charging device comprises at least one transmitting coil; the method is noteworthy in that it comprises the following steps for each coil:

a. detecting the presence of an object on a charging surface of said device;

b. checking charging conditions;

c. if the charging conditions are favorable:

d. transmitting, to the object, an electrical pulse the value of which is within a window of values predetermined beforehand using test receivers;

e. if the object transmits a communication signal lower than a maximum value in response, then an object to be charged is detected, otherwise:

f. in the absence of a communication signal, or a communication signal of maximum value, then transmitting, to the object, a modified electrical pulse the value of which is located outside of the window of predetermined values:

g. if the object transmits a communication signal in response, then an object to be charged is detected;

h. otherwise a parasitic object is detected.

In the absence of a communication signal, the modified electrical pulse has a voltage higher than an upper limit predetermined beforehand using test receivers.

If the object transmits a communication signal of maximum value, the modified electrical pulse has a voltage lower than a lower limit predetermined beforehand using test receivers.

If the charging conditions are unfavorable, then the modified electrical pulse has a voltage lower than a lower limit predetermined beforehand using test receivers.

When the charging conditions are unfavorable for a coil, the method is stopped for said coil.

The charging device comprising a plurality of transmitting coils, the method is repeated for each coil.

The method comprises a prior step of calibrating the voltage values of the modified electrical pulse outside of the window of predetermined values according to various types of objects to be charged.

The checking of favorable charging conditions comprises measuring at least one parameter of the at least one transmitting coil and comparing said measurement with predetermined threshold values of the same parameter, obtained beforehand for various types of objects to be charged.

The parameter may be a quality factor, and/or a variation in resistance and/or a variation in inductance, and/or a variation in a resonant frequency of the transmitting coil.

An aspect of the invention also applies to a device for charging an object, comprising at least one transmitting coil and noteworthy in that it comprises:

a. means for detecting an object on the charging surface;

b. and, for each coil:

c. means for checking charging conditions;

d. means for detecting the reception of a communication signal and for comparing the value of said received communication signal with a maximum value;

e. means for modulating a value of an electrical pulse transmitted by the at least one coil, outside of a window of values predetermined beforehand using test receivers, according to the result of said check and according to the presence and/or the value of the communication signal.

The checking means comprise means for measuring at least one parameter of the transmitting coil and means for comparing the measurement with predetermined threshold values of the same parameter, obtained beforehand for various types of objects to be charged.

The parameter may be a quality factor, and/or a variation in resistance and/or a variation in inductance, and/or a variation in a resonant frequency of the transmitting coil.

An aspect of the invention also relates to a computer program product comprising program code instructions for carrying out the steps of the detection method according to any one of the features given above, when said program is executed on a computer.

Finally, an aspect of the invention applies to any motor vehicle comprising a charging device according to any one of the features given above.

BRIEF DESCRIPTION OF THE DRAWINGS

Other features and advantages of aspects of the invention will become more apparent from reading the description which follows. This description is purely illustrative and should be read with reference to the appended drawings, in which.

DETAILED DESCRIPTION OF THE PREFERRED EMBODIMENTS

Figure 1:
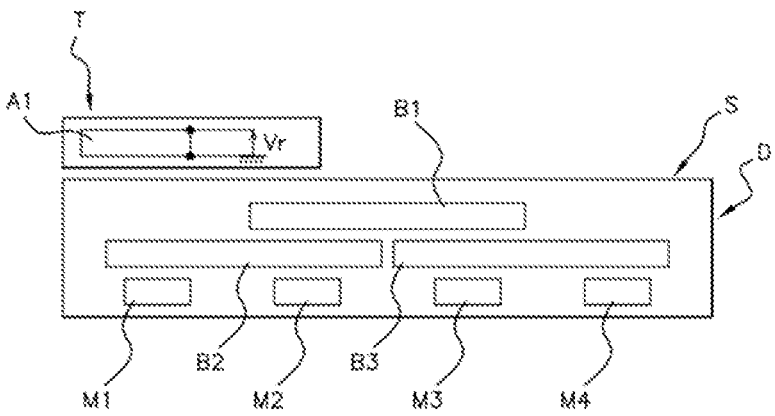
FIG. 1 schematically shows an object to be charged T located at one end of a charging device D.

As explained above, the initiation of charging or the charging of an object may be inhibited since the value of the rectified voltage Vr of the object to be charged, induced by the transmission of a digital ping by the charging device, is above or below limits that have been set by the manufacturers of said objects via the Qi standard. To avoid exceeding these limits, the voltage values of the digital ping are determined beforehand in a phase of certification to the Qi standard using test receivers.

This problem of charging not being initiated is mainly due to the intrinsic construction of the object to be charged T (size of the receiving coil, position of the coil in the object, object having a high metal component) and/or its position on the charging surface S of the charging device D. These are actual charging conditions which differ significantly from the optimal charging conditions used in the certification phase.

An aspect of the invention proposes a method for detecting an object to be charged T and a charging device D that make it possible to overcome the drawbacks mentioned above.

To that end, the charging device D according to an aspect of the invention comprises at least one transmitting coil B1 and means for controlling said coil, i.e. means for generating and controlling charging, i.e. an electromagnetic field directed toward an object to be charged T. This is known from the prior art and will not be described in more detail here.

The charging device D comprises a charging surface S on which the object to be charged T is placed. The object may be a smartphone, a tablet, or even any connected object that can be charged using the Qi standard, i.e. the Wireless Power Consortium standard for induction charging.

The charging device D is intended to be installed on board a motor vehicle and, to that end, its charging surface is sized to accommodate any type of object to be charged T of varying size. In this example, said device comprises no means for securing or for holding the object to be charged T to the charging surface S. Thus, most objects to be charged T placed on the charging surface S will be able to slide freely over said surface S depending on the vehicle's movements. Specifically, the problem of initiation of charging being inhibited arises for this type of charging device D especially, since as the vehicle moves, the object to be charged T may move into a corner of the charging device and charging stops as explained above.

According to an aspect of the invention, the charging device D comprises means M1 for detecting that an object has been placed on the charging surface S. These detection means consist of means for transmitting an electrical pulse, i.e. an analog ping, and means for measuring parameters such as the variation in voltage, in impedance, or in resonant frequency of the transmitting coils. The detection means M1 may also comprise sensors, such as capacitive sensors, means for detecting GSM (Global System for Mobile Communication) coupling, i.e. means for detecting 2G communication with a cellphone, or an NFC antenna. These detection means are known to those skilled in the art and will not be described in more detail here.

The device D also comprises means M2 for checking charging conditions for each of the coils. In this example, a device D equipped with three transmitting coils B1, B2, B3 will be considered, as illustrated in FIG. 1.

These means M2 consist of measurements of parameters of the transmitting coils B1, B2, B3, such as:

a. the quality factor Q of the coils B1, B2, B3; and/or b. the variation in resistance $\Delta R$ of said coils; and/or c. the variation in inductance $\Delta L$ of said coils; and/or d. the variation in the resonant frequency $\Delta Fres$ of said coils;

and means for comparing these measurements with predetermined threshold values.

What is meant by "variation" in the resistance $\Delta R$, inductance $\Delta L$ and resonant frequency $\Delta Fres$ parameters is the difference, for each of these parameters, between the "no-load" value of the parameter, i.e. without any object placed on the charging surface S, and the value of the same parameter with an object placed on the charging surface S.

The predetermined threshold values are minimum and maximum values determined beforehand for each coil and for various types of objects to be charged T, for example for various types of cellphone, with or without a protective metal shell, phones comprising very few metal parts or, conversely, phones with a lot of metal, phones comprising a small receiving coil or, conversely, a very large receiving coil, etc.

For example, the value of the quality factor Q1 of a first coil B1 is compared with a minimum value Q1min and a maximum value Q1max determined beforehand for this same first coil B1.

Similarly, the value of the variation in resistance $\Delta R1$ for the first coil B1 is compared with a minimum value of the variation in resistance ΔR1min and a maximum value of the variation in resistance ΔR1max determined beforehand for this same first coil B1.

This applies similarly for the variation in inductance ΔL and for the variation in resonant frequency ΔFres for each of the three coils B1, B2, B3 as will be explained further on.

The device also comprises means M3 for detecting the reception of an SSP communication signal and for comparing the value of said received communication signal with a maximum value SSPmax. The detection and comparing means comprise a demodulator in order to demodulate the received communication signal and software means in order to compare the value of said signal with a predetermined maximum value SSPmax.

Lastly, the charging device D comprises means M4 for modulating the values of the electrical pulse, or digital ping, transmitted by each of the coils B1, B2, B3 outside of windows of predetermined values which have been defined beforehand using test receivers in a phase of certifying the device to the Qi standard. The one or more coils then transmit a modified electrical pulse DPm. Said modulation of the value of the electrical pulse is performed according to the result of said check of favorable conditions and according to the presence and/or the value of the SSP communication signal. What is meant by "value" is, for example, the voltage of the electrical pulse.

The modulation means M4 may comprise modified electrical pulse values DPm that are outside of the window of predetermined values depending on various types of objects to be charged T. Thus, the means for checking M2 the charging conditions may indicate the type of the object to be charged, and the voltage of the modified electrical pulse DPm that is applied is then chosen from among values calibrated beforehand according to the type of object T and stored in the charging device, for example in the modulation means M4.

The means for checking favorable conditions M2 and the means M3 for detecting the reception of an SSP communication signal and for comparing the value of said received communication signal with a maximum value SSPmax, and the means M4 for modulating the values of the electrical pulse, preferably take the form of software and are based in a microcontroller located in the device D.

Figure 5:
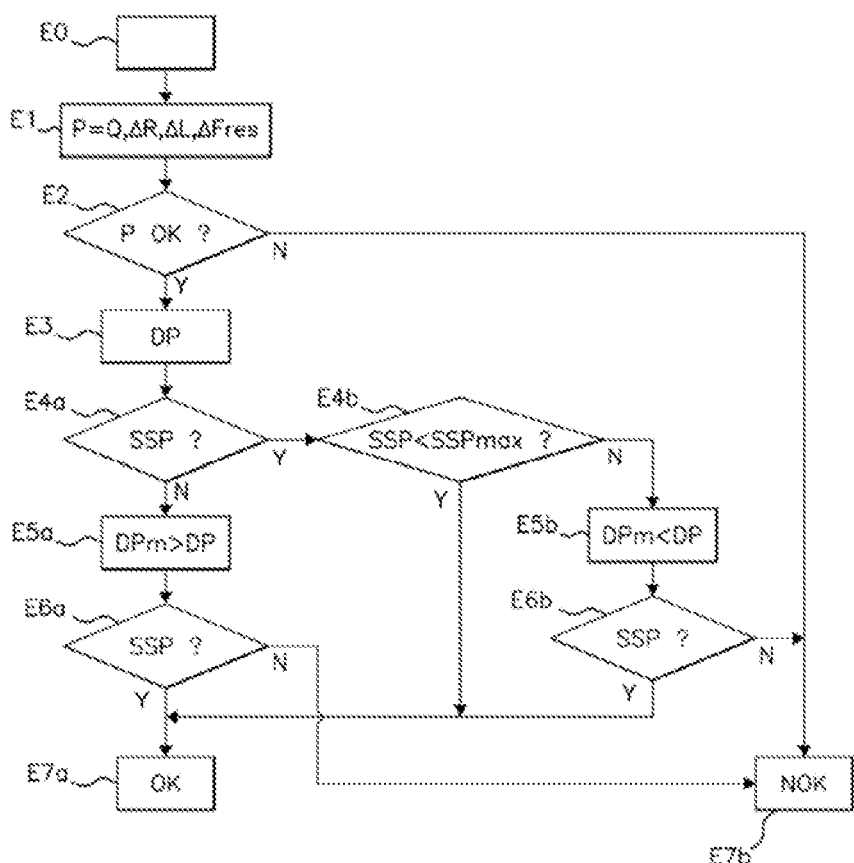
FIG. 5 is a flowchart showing the various steps of the detection method according to an aspect of the invention.

The method for detecting an object to be charged T, illustrated in FIG. 5, will now be described.

In a prior step (step E0), it is detected that an object has been placed on the charging surface S of a charging device D. This object may be an object to be charged, i.e. an object compatible with induction charging according to the Qi standard, but it may also be a "parasitic" object such as a paper clip or a coin.

This detection is achieved by the transmitting coils B1, B2, B3 of the charging device D transmitting analog ping-type electromagnetic pulses at a regular frequency and measuring the variation in parameters such as voltage, impedance or resonant frequency, or this detection is achieved using capacitive sensors or other means for detecting the presence of an object. If significant variations in said parameters are measured, then this means that an object has been detected as having been placed on the charging surface S.

In a first step E1, the detection method according to an aspect of the invention proposes checking what are called "environmental" charging conditions.

In this step, the parameters such as:
a. the quality factor Q of the coils B1, B2, B3, and/or;
b. the variation in resistance ΔR of said coils; and/or c. the variation in inductance ΔL of said coils; and/or
d. the variation in the resonant frequency ΔFres of said coils are measured for each transmitting coil B1, B2, B3 in a first stage.

According to an aspect of the invention, just one parameter may be used, or a combination of two, of three or of four parameters to check the charging conditions. The number or type of parameter may vary according to the transmitting coil B1, B2, B3 in question.

Next, in a second stage E2, the values thus measured for each transmitting coil B1, B2, B3 are compared with predetermined threshold values.

The threshold values have been determined beforehand for various types of object to be charged T exhibiting different characteristics: phone with few metal parts, phone with many metal parts, phone with a large receiving antenna A1, or phone with a small receiving coil A1.

Thus, it is possible to check for each receiving coil B1, B2, B3 that:

$$Qi\text{min} < Qi < Qi\text{max} \qquad \text{[Math 1]}$$

where
Qi: quality factor of the ith coil
Qimin: minimum quality factor of the ith coil
Qimax: maximum quality factor of the ith coil
Likewise, it is also possible to check that:

$$\Delta Ri\text{min} < \Delta Ri < \Delta Ri\text{max} \qquad \text{[Math 2]}$$

where
ΔRi: variation in resistance of the ith coil
ΔRimin: minimum variation in resistance of the ith coil
ΔRimax: maximum variation in resistance of the ith coil
Similarly, it is possible to check that:

$$\Delta Li\text{min} < \Delta Li < \Delta Li\text{max} \qquad \text{[Math 3]}$$

where
ΔLi: variation in inductance of the ith coil
ΔLimin: minimum variation in inductance of the ith coil
ΔLimax: maximum variation in inductance of the ith coil
Lastly, it is possible to check that:

$$\Delta Fresi\text{min} < \Delta Fresi < \Delta Fresi\text{max} \qquad \text{[Math 4]}$$

where
ΔFresi: variation in resonant frequency of the ith coil
ΔFresimin: minimum variation in resonant frequency of the ith coil
ΔFresimax: maximum variation in resonant frequency of the ith coil
As explained above, the checking of just one parameter may be enough on each of the transmitting coils B1, B2, B3 to conclude that the charging conditions are favorable. The checks on these parameters are not necessarily combinable to determine whether the charging conditions are favorable.

The charging conditions are said to be favorable for a transmitting coil when at least one of the check criteria is met.

Two cases are then possible:
a. either the charging conditions are favorable, and the method continues on to step E3 with at least one of the coils B1, B2, B3 of the charging device D sending a digital ping DP;
b. or the charging conditions are unfavorable, and the method stops (step E7b) and no coil transmits a digital ping DP.

In one variant of the method, if the conditions are unfavorable, the method continues and proposes that the charging device transmit a modified digital ping DPm the value of which (the voltage here) is below a lower (voltage) limit determined beforehand using test receivers in a phase of certification to the Qi standard, as explained above.

Once the charging conditions have been checked, if they are favorable, specifically if the one or more parameters chosen from among the four parameters listed above are indeed within the predetermined threshold values for at least one transmitting coil B1, B2 or B3 (step E2), then the charging device D transmits a digital ping DP (step E3) via this transmitting coil. If the charging conditions are met for all of the coils, then the transmitting coils each transmit in turn a digital ping DP to the object (step E3).

If the object responds to this digital ping DP by sending a communication signal, called an "SSP" ("signal strength packet") signal (step E4a), i.e. a signal containing a value representative of the voltage induced Vr by the received signal, with a value lower than a maximum value SSPmax (step E4b), then induction charging is initiated (step E7a). Specifically, the "SSP" signal is a value representative of a ratio of the value of the rectified voltage Vr across the terminals of the voltage rectifier of the receiving coil A1 induced by receiving the electromagnetic field created by the digital ping DP to the maximum rectified voltage that the object to be charged is able to withstand when receiving a digital ping DP.

In a first embodiment of the method according to the invention, if the object does not send an "SSP" signal, then either it is a parasitic object or it is an object to be charged but one that has a rectified voltage value Vr that is too low with respect to the rectified voltage limits specified by cellphone manufacturers to initiate charging, this insufficiently high rectified voltage not allowing it to send an "SSP" communication signal to the charging device D in order to initiate charging.

In that case, if the object to be charged does not return an "SSP" communication signal, then the method according to an aspect of the invention proposes that the charging device send a modified digital ping DPm with a value (voltage here) that is higher than the upper limit determined in the certification phase (step E5a), i.e. a value that would result in a rectified voltage Vr in the test receivers higher than the limits specified by the Qi standard.

Once the modified digital ping DPm has been sent, as step E5a, two cases are possible: either the object returns an SSP communication signal (step E6a) and charging starts (step E7a) or no SSP communication signal is sent (step E6a) and charging is not initiated (step E7b).

Figure 2:
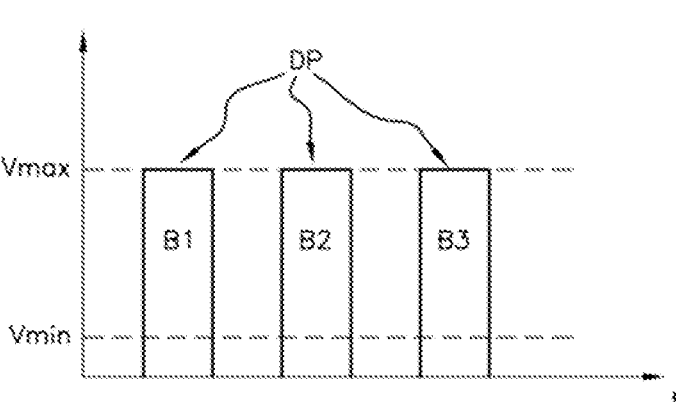
FIG. 2 is a graph showing the digital pings of identical voltage values sent by each of the transmitting coils, according to the prior art.

FIG. 2 shows, in a graph, the digital pings DP sent by each of the transmitting coils B1, B2, B2 according to the prior art. These are all of the same voltage equal to the upper voltage limit Vmax defined in the certification phase so that all of the test receivers respond to the charging device D by sending an SSP signal without their rectified voltage exceeding the maximum values dictated by the standard.

Figure 3:
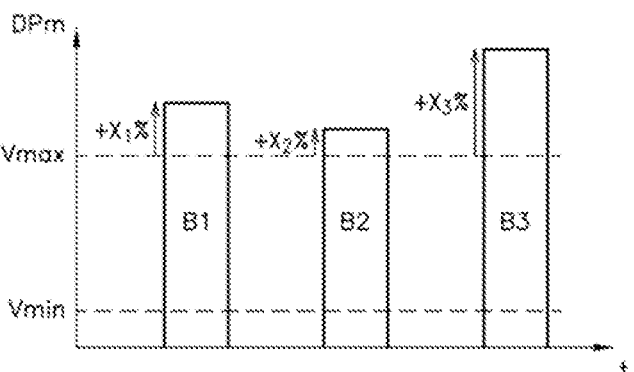
FIG. 3 is a graph showing modified digital pings sent by each of the transmitting coils, according to a first variant of the detection method according to an aspect of the invention.

FIG. 3 shows, in a graph, a first example of modified digital pings DPm sent by each of the coils B1, B2, B3 according to the method of an aspect of the invention. The modified digital pings DPm vary in value from coil to coil and in this case each have a voltage higher than the upper voltage limit Vmax of the prior art. The voltage of the digital pings DPm has increased by X1%, X2%, and X3% with respect to the voltage Vmax for the first coil B1, the second coil B2 and the third coil V3, respectively.

In a second embodiment of the method according to the invention, if the object to be charged returns an SSP signal of maximum value SSPmax (step E4b), the maximum value being dictated by the Qi standard and equal to SSPmax=255, (a demodulator in the microcontroller of the charging device demodulates the SSP communication signal sent by the object to be charged and compares it with the maximum value of 255), then the method proposes that the charging device D send a modified digital ping DPm, this time with a value (voltage here) that is lower than the lower limit Vmin determined in the certification phase (step E5b), i.e. a value that would result in a rectified voltage Vr in the test receivers lower than the limits specified by the Qi standard.

Then, once the modified digital ping DPm has been sent, as step E5b, two cases are possible: either the object returns an SSP communication signal (step E6b) and charging starts (step E7a) or no SSP communication signal is sent (step E6b) and charging is not initiated (step E7b).

Figure 4:
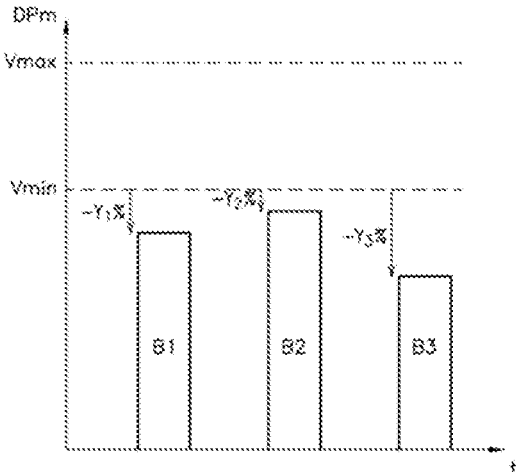
FIG. 4 is a graph showing modified digital pings sent by each of the transmitting coils, according to a second variant of the detection method according to an aspect of the invention.

FIG. 4 shows, in a graph, a second example of modified digital pings DPm sent by each of the coils B1, B2, B3. The modified digital pings DPm vary from coil to coil and in this case each have a voltage lower than the lower limit Vmin of the prior art. The voltage of the digital pings has decreased by Y1%, Y2%, and Y3% with respect to the lower limit Vmin for the first coil B1, the second coil B2 and the third coil V3, respectively.

Of course, the method may comprise a prior step of calibrating the voltage values of the modified electrical pulse DPm outside of the window of predetermined values, this window being defined by the upper limit and the lower limit Vmin, Vmax according to various types of objects to be charged T. Thus, the charging conditions may indicate the type of object to be charged, and the voltage of the modified electrical pulse DPm that is applied is then chosen from among values calibrated beforehand and stored in the charging device according to the type of object T.

It may also be possible for the transmitting coils B1, B2, B3 of the same charging device D to transmit modified digital pings the voltage of which is either lower or higher than the lower or upper limits Vmin, Vmax of the prior art, or even for a coil not to transmit any digital ping at all, as explained above.

Figure 6A:
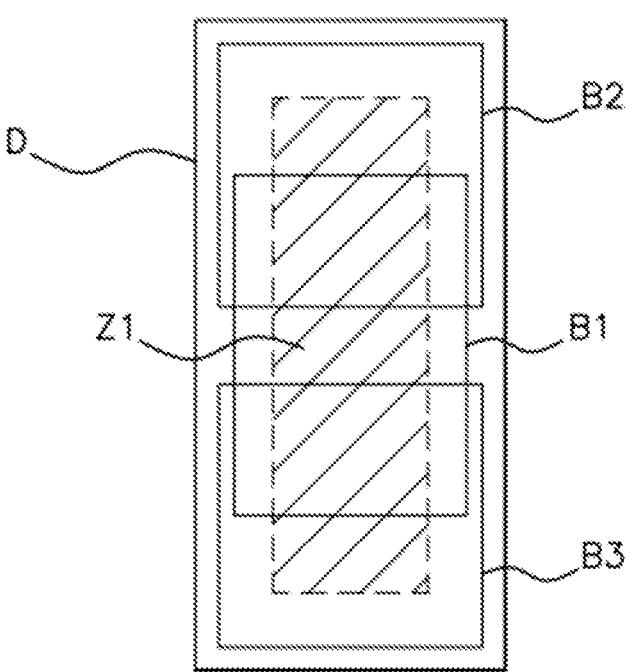
FIG. 6A schematically shows a detection region for an object to be charged on a charging surface of a charging device according to the prior art.

FIG. 6A illustrates the region Z1 for placing an object to be charged T on the surface of a charging device D that allows charging to be initiated according to the prior art.

Figure 6B:
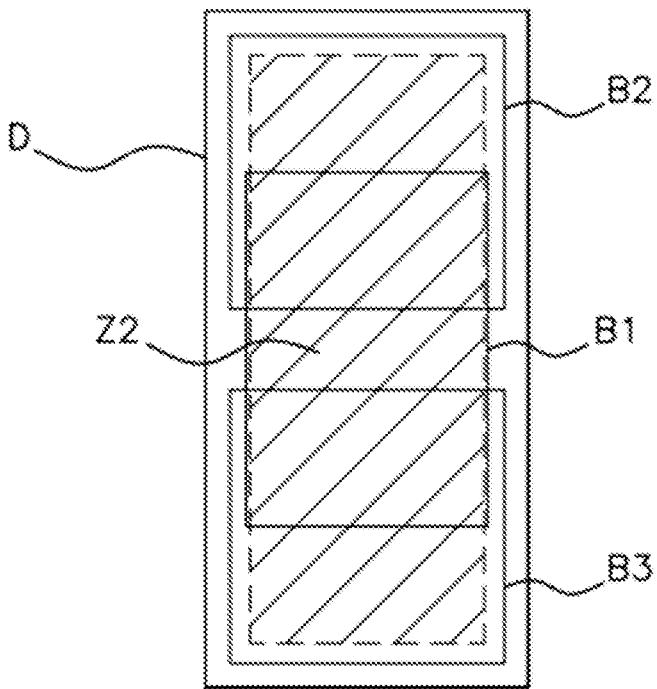
FIG. 6B schematically shows a detection region for an object to be charged on a charging surface of a charging device according to an aspect of the invention.

FIG. 6B illustrates the region Z2 for placing an object to be charged T on the surface of a charging device D that allows charging to be initiated with the detection method according to an aspect of the invention. It is clearly apparent from comparing the two graphs 6a and 6b that the region Z2 that allows charging to be activated is significantly larger than the region Z1 of the prior art by virtue of the detection method according to an aspect of the invention.

The detection method according to an aspect of the invention therefore allows the drawbacks of the prior art to be overcome. Specifically, the method of an aspect of the invention allows better identification of compatible objects to be charged with respect to parasitic objects placed on the charging surface and, above all, it allows the size of the region on the charging surface of the charging device that allows charging to be increased.

The invention claimed is:

1. A method for detecting an object to be charged by an induction-charging device comprising at least one transmitting coil, the method comprising:

transmitting, by the at least one coil, an analog signal to detect whether charging conditions are favorable;

transmitting, by the at least one coil, an electrical pulse the value of which is within a window of values predetermined using test receivers in a certification phase of the Wireless Power Consortium (WPC) standard to the object to be charged; and if charging conditions are favorable, in the absence of a communication signal modulating the value of the electrical pulse outside of the window of predetermined values of the WPC standard in order to detect the presence of the object to be charged, wherein the modulated electrical pulse has a voltage higher than an upper limit of the window of predetermined values of the WPC standard, and when a communication signal is received by the at least one coil at a maximum value, modulating the value of the electrical pulse outside of the window of predetermined values of the WPC standard in order to detect the presence of the object to be charged, wherein the modulated electrical pulse has a voltage lower than a lower limit of the window of predetermined values of the WPC standard.

2. The method for detecting an object to be charged by a charging device as claimed in claim 1, comprising at least one transmitting coil, the method further comprising the following steps for each coil:

a) detecting the presence of an object on a charging surface of said device;

b) checking charging conditions;

c) if the charging conditions are favorable:

i) transmitting, to the object, an electrical pulse the value of which is within a window of values predetermined beforehand using test receivers in a certification phase;

ii) if the object transmits a communication signal lower than a maximum value in response, then an object to be charged is detected, otherwise:

iii) in the absence of a communication signal, or a communication signal of maximum value, then transmitting, to the object, a modified electrical pulse the value of which is located outside of the window of predetermined values:

a. if the object transmits a communication signal in response, then an object to be charged is detected;

b. otherwise a parasitic object is detected.

3. The detection method as claimed in claim 1, wherein if the charging conditions are unfavorable, then the electrical pulse has a voltage lower than a lower limit predetermined beforehand using test receivers in a certification phase.

4. The detection method as claimed in claim 1, wherein when the charging conditions are unfavorable for a coil, terminating transmission of the electrical pulse by the at least one coil.

5. The detection method as claimed in claim 1, wherein, the charging device comprises a plurality of transmitting coils, the method is repeated for each coil.

6. The detection method as claimed in claim 5, wherein when modulating the value of the electrical pulse based on the absence of a communication signal, modulating the value of the electrical pulse transmitted from each of the plurality of transmitting coils at a voltage higher than the upper limit of the window of predetermined values of the WPC standard, wherein the voltage for each transmitting coil is proportional to a different percentage value from the higher limit for each of the plurality of transmitting coils.

7. The detection method as claimed in claim 5, wherein when modulating the value of the electrical pulse based on receiving a communication signal at a maximum value, modulating the value of the electrical pulse transmitted from each of the plurality of transmitting coils at a voltage lower than the lower limit of the window of predetermined values of the WPC standard, wherein the voltage for each transmitting coil is proportional to a different percentage value from the lower limit for each of the plurality of transmitting coils.

8. The detection method as claimed in claim 1, further comprising a prior step of calibrating the voltage values of the modified electrical pulse outside of the window of predetermined values according to various types of objects to be charged.

9. The detection method as claimed in claim 1, wherein the checking of favorable charging conditions comprises measuring at least one parameter of the at least one transmitting coil and comparing said measurement with predetermined threshold values of the same parameter, obtained beforehand for various types of objects to be charged.

10. The detection method as claimed in claim 9, wherein the parameter is a quality factor, and/or a variation in resistance and/or a variation in inductance, and/or a variation in a resonant frequency of the transmitting coil.

11. A non-transitory computer program product comprising program code instructions for carrying out the steps of the detection method as claimed in claim 1, when said program is executed on a computer.

12. A device for charging an object, comprising at least one transmitting coil, the device comprising:

a) means for detecting an object on the charging surface; and, for each coil:

b) means for checking charging conditions based on transmitting an analog signal to detect whether charging conditions are favorable;

c) means for detecting the reception of a communication signal and for comparing the value of said received communication signal with a maximum value; and d) means for modulating a value of an electrical pulse transmitted by the at least one coil, outside of a window of values predetermined beforehand using test receivers in a certification phase of the of the Wireless Power Consortium (WPC) standard, according to the result of said check and according to the presence and/or the value of the communication signal, wherein in an absence of a communication signal, the value of the electrical pulse is modulated outside of the window of predetermined values of the WPC standard in order to detect the presence of the object to be charged, wherein the modulated electrical pulse has a voltage higher than an upper limit of the window of predetermined values of the WPC standard, and when a communication signal is received by the at least one coil at a maximum value, modulating the value of the electrical pulse outside of the window of predetermined values of the WPC standard in order to detect the presence of the object to be charged, wherein the modulated electrical pulse has a voltage lower than a lower limit of the window of predetermined values of the WPC standard.

13. The device for charging an object as claimed in claim 12, wherein the checking means comprise means for measuring at least one parameter of the transmitting coil and means for comparing the measurement with predetermined threshold values of the same parameter, obtained beforehand for various types of objects to be charged.

14. The charging device as claimed in claim 13, wherein the parameter is a quality factor, and/or a variation in resistance and/or a variation in inductance, and/or a variation in a resonant frequency of the transmitting coil.

15. A motor vehicle comprising a charging device as claimed in claim 12.

16. The device for charging an object as claimed in claim 12, wherein when modulating the value of the electrical pulse based on the absence of a communication signal, modulating the value of the electrical pulse transmitted from each coil at a voltage higher than the upper limit of the 5 window of predetermined values of the WPC standard, wherein the voltage for each coil is proportional to a different percentage value from the higher limit for each of the coils.

17. The device for charging an object as claimed in claim 10 12, wherein when modulating the value of the electrical pulse based on receiving a communication signal at a maximum value, modulating the value of the electrical pulse transmitted from each coil at a voltage lower than the lower limit of the window of predetermined values of the WPC 15 standard, wherein the voltage for each coil is proportional to a different percentage value from the lower limit for each of the coils.

\* \* \* \* \*